Oct. 18, 1949.                S. A. McKUSKIE                2,485,243
                                 GLASS BRICK
Filed March 30, 1945                                    2 Sheets-Sheet 1
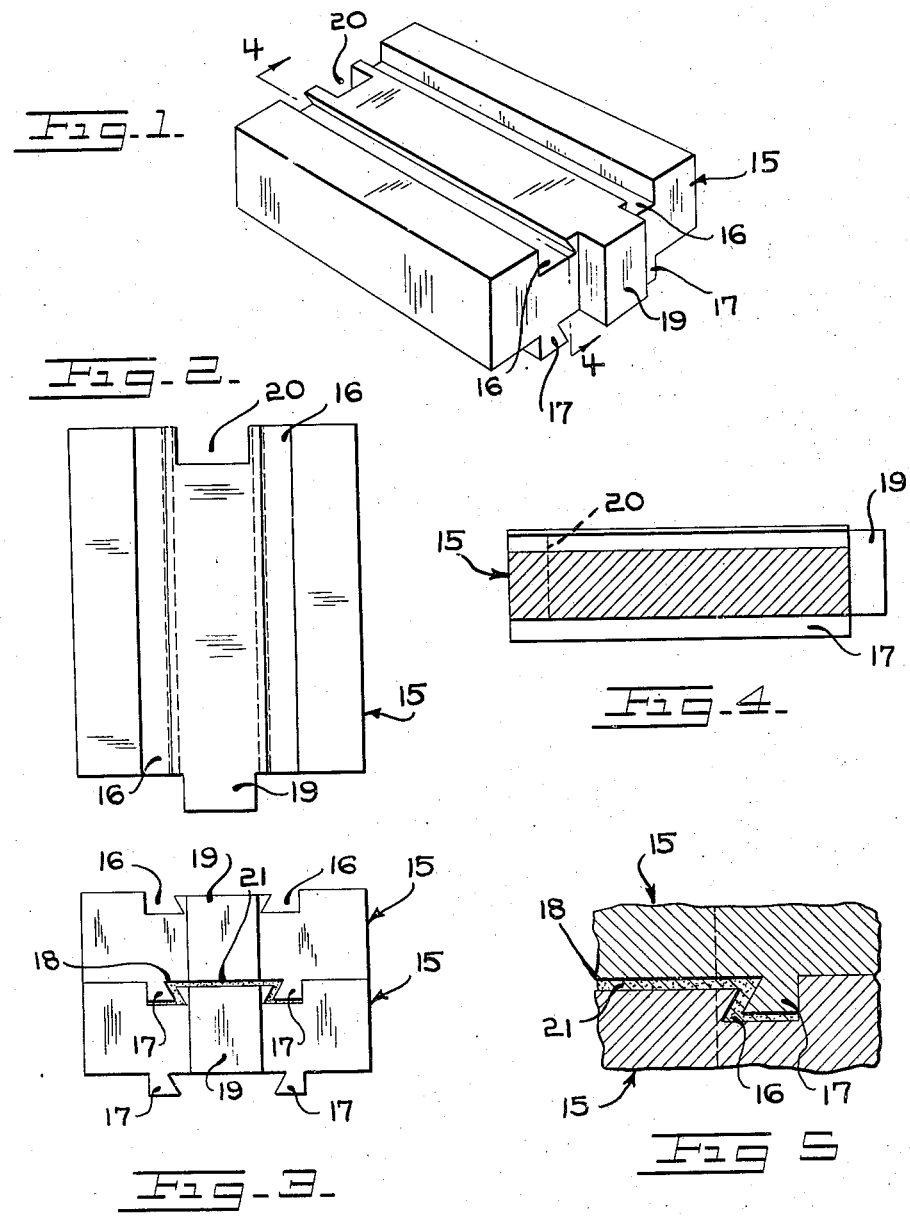
INVENTOR.
Stanley A. McKuskie
BY
ATTORNEY.

Oct. 18, 1949. S. A. McKUSKIE 2,485,243
GLASS BRICK
Filed March 30, 1945 2 Sheets-Sheet 2
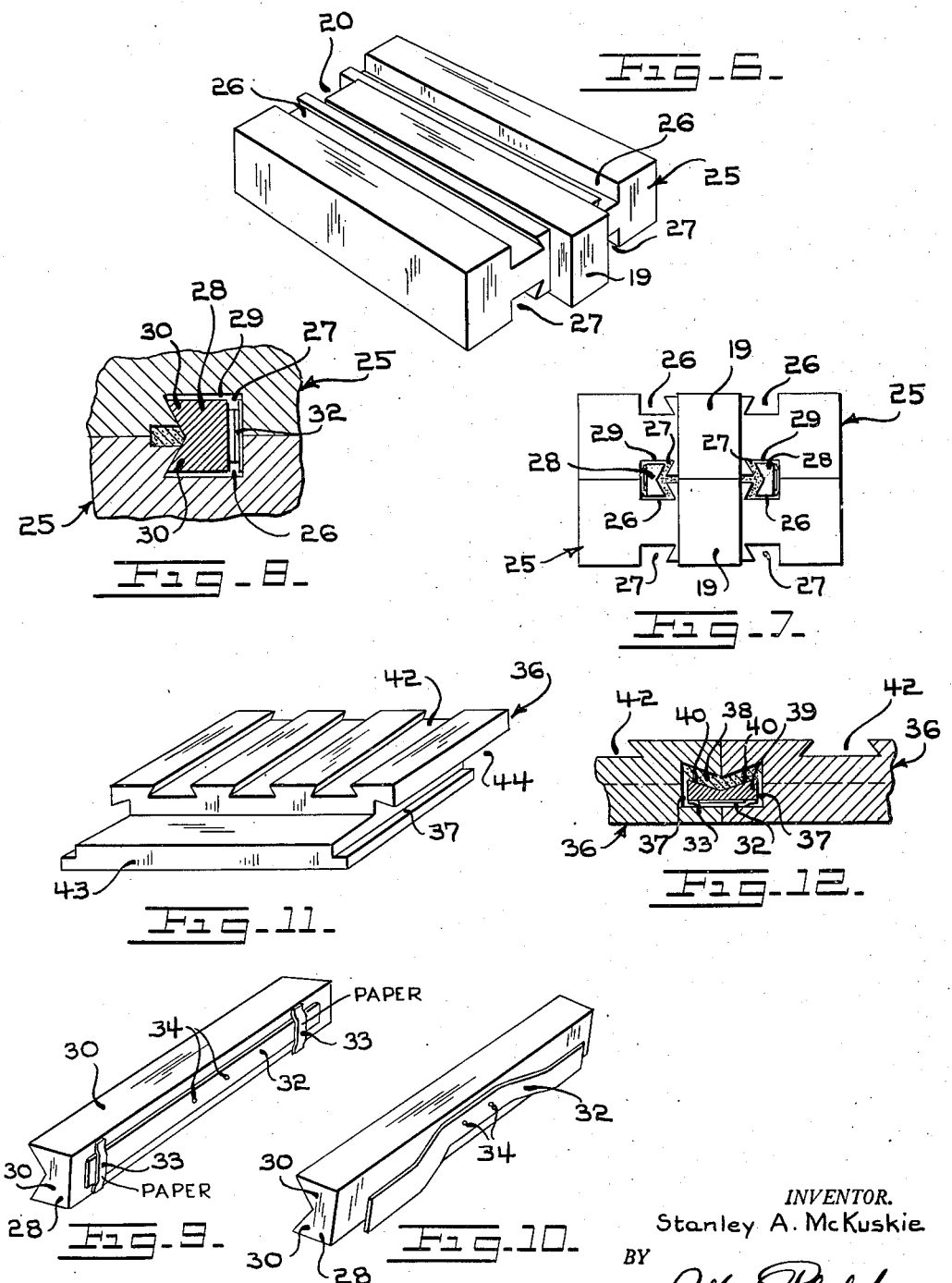
INVENTOR.
Stanley A. McKuskie
BY
ATTORNEY.

Patented Oct. 18, 1949

2,485,243

UNITED STATES PATENT OFFICE 2,485,243

GLASS BRICK

Stanley A. McKuskie, Bronx, N. Y., assignor to DMG Corporation

Application March 30, 1945, Serial No. 585,653

3 Claims. (Cl. 72—107)

1

This invention relates to new and useful improvements in bricks, tiles, shingles and the like objects.

More specifically, it is proposed to so construct the brick, or block, or other object so that two, or more of them may be bonded together without exposing the bonding agent to the weather. With this construction it is possible to use any bonding material which can harden, as a bonding agent. The new and improved blocks may be constructed of clay, glass, thermo-plastic, or other substances.

The blocks can be of any shape, or size depending on their use. For example, they may be blocks for partitions and faced on one or more sides, or plastered, and bonded with cement, or a suitable plastic. They may be heavier blocks such as perforated glass, and can be used for load bearing walls. They can be for use as roof shingles, or other shingles.

It is proposed to so construct the blocks that they are bonded together with keyways which have their tongues or lands either of separate units, or as parts of the blocks. These keyways may be of any size, or shape but preferably of a shape that will bond interengagement, or friction, making adhesive qualities in the brick unnecessary.

The dominating advantage of the new brick, or block, or other similar article is that the joining cement, or bond will not be exposed to the weather, and that the bonding agent does not have to carry the weight of the structure. A great deal of expense will be eliminated because so little of the bonding material is needed. It also leaves a clean tile effect, or cuts plastering down to one, or two coats. It also makes it possible to use such materials as glass, or thermo-plastic which have very poor adhesive qualities.

If the blocks are constructed of glass, it is advisable that they be all of a cellular nature, or perforated.

Several modified forms of the invention have been disclosed in this specification, for illustrative purposes.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a perspective view of a building brick, or block constructed in accordance with this invention.

2

Fig. 2 is a plan view of Fig. 1.

Fig. 3 is an end elevational view showing two identical block, similar to the blocks shown in Fig. 1, but placed one upon the other.

Fig. 4 is a longitudinal sectional view taken on the line 4—4 of Fig. 1.

Fig. 5 is a fragmentary enlarged transverse sectional view of a portion of Fig. 3.

Fig. 6 is a perspective view of another brick, or block constructed in accordance with another form of this invention.

Fig. 7 is an end elevational view of two blocks similar to the block shown in Fig. 6 but placed one upon the other and joined with keyway members.

Fig. 8 is a fragmentary enlarged transverse sectional view of a portion the blocks shown in Fig. 7.

Fig. 9 is a perspective view of one of the keyway members shown in Fig. 7.

Fig. 10 is a perspective view of the keyway member shown in Fig. 9, but in a different position.

Fig. 11 is a perspective view of a shingle embodying this invention.

Fig. 12 is a fragmentary enlarged sectional view through a pair of shingles similar to the shingle shown in Fig. 11.

The bricks, or blocks or other similar objects, in accordance with this invention, as illustrated in Figs. 1 to 5 inclusive, includes a brick, or block 15 of any design and construction and of any material, provided it is formed with grooves 16 in one face which are spaced inwards from the adjacent faces, or edges. Projections 17, in the nature of keyway members, are arranged on the face opposed to the face provided with the grooves 16. These projections 17 are complementary to the grooves 16 so as to be capable of mating into similar grooves of similar blocks, or bricks. The projections 17 are slightly smaller than the grooves 16, to provide spaces 18 (see Fig. 3) for the mortar or cement between adjacent similar blocks, or bricks.

The bricks, or blocks 15 are also provided with end projections 19 complementary to recesses 20 formed on the opposed ends. These projections 19 and recesses 20 are adapted to mate with complementary projections and recesses of adjacent similar bricks or blocks.

The bricks or blocks are used in walls similar to present day bricks or blocks. However, the cement used to bond the bricks, or blocks together, for example, the mortar 21, as illustrated in Figs. 3 and 5, will be encased by the bricks and blocks so as not to be exposed to the weather. Furthermore, the bricks, or blocks 15 when stacked, or built one upon the other, will then have their adjacent faces engaging each other, as clearly shown in Figs. 3 and 5, so as to take the weight off of the mortar, cement or other bonding material 21.

In Figs. 6 to 10 inclusive, another form of the invention has been disclosed which is very similar to the prior form distinguishing merely in the fact that the keyway members used to bond the bricks, or blocks together are separate members. More specifically, the bricks, or blocks 25 are provided with grooves 26, in one of their faces which are spaced inwards from the adjacent edges or faces.

The bricks, or blocks 25 are also provided with other grooves 27, formed in opposed faces for location opposed to the first named grooves, like the grooves 26, but of other similar adjacent brick, or block. A keyway member 28 is provided for each pair of grooves 26 and 27 of adjacent blocks, or bricks for holding adjacent blocks, or bricks together. The keyway members 28 are somewhat smaller than the grooves in which they engage to provide spaces 29 for the mortar, cement, or other bonding materials used between adjacent similar bricks, or blocks.

The keyway members 29 may be of any design, or shape provided they are capable of interengaging, or connecting the bricks, or blocks together. As illustrated, the keyway members 28 are provided with tongues, or lands 30 engageable with complementary surfaces of grooves 26 and 27.

If desired the keyway members 28 may be provided with leaf springs 32 normally held flat with fragile elements 33, such as paper, destructible with water, or moisture. These leaf springs 32 are held at their centers with fastening elements 34. Their ends are free so as to extend, when they are released, by the fragile elements 33. These leaf springs 32 are arranged opposed to the tongues or lands 30 of the keyway members.

The bricks, or blocks are built into walls in the usual way. However, the cement, or mortar will be contained in the spaces 29, and will be shielded from the weather. The mortar, or cement, furthermore, will not take the load because adjacent faces of the bricks, or blocks are contacting each other. The keyway members 28 are engaged into the grooves 26 and 27, and the mortar, or cement is engaged about the keyway members.

When the keyway members 28 are provided with leaf springs 32, they are used identically the same way as described up to this point.

However, when the moisture of the water, or cement destroys the fragile elements 33, the leaf springs 32 will be released and will flex so that they engage against one of the walls of the grooves 26 and 27 and move the keyway members towards the other of the walls of said grooves. The cement, or mortar will flow around the keyway members during this motion and the tongues or lands of the keyway members in their new positions, will better engage the complementary surfaces of the grooves 26 and 27 with which they mate.

In Figs. 11 and 12, another embodiment of the invention has been disclosed which is very similar to the prior form of the invention. More specifically, a shingle 36 is provided with edge grooves 37 which will form spaces 38 for the cement, or mortar when adjacent shingles are placed together. The keyway member 39 is used to join the adjacent ends of the shingles 36. Said keyway member 39 is engaged in the grooves 38. Each of the keyway members 39 have tongues, or lands 40 opposed to complementary surfaces of the grooves 37. If desired, the keyway members 39 are provided with leaf springs 32 mounted upon one of their faces and associated with fragile elements 33 destructible with moisture, as previously explained.

The shingles 36 have one of their faces formed with grooves 42 for plaster, or other finishing materials. The front and rear ends of each shingle 36 are provided with projecting parts 43 and complementary recesses 44, so that these projections and recesses will mate with similar shingles when they are placed together.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. Means for connecting together a pair of superimposed bricks having their adjacent faces abutting one another, the bricks having their adjacent faces formed with spaced aligned pairs of under-cut grooves, a keyway member engaged within each of said pair of grooves and having lands on one of their faces arranged complementary to and facing the under-cut portions of said grooves, resilient means urging said keyway members to engage said lands with the undercut portions of said grooves to lock the bricks against movement relative to each other, said keyway member being smaller than said grooves forming mortar spaces between the faces of said keyway members and the adjacent walls of the bricks defining said grooves, and mortar filling said mortar spaces.

2. Means for connecting together a pair of superimposed bricks having their adjacent faces abutting one another, the bricks having their adjacent faces formed with spaced aligned pairs of under-cut grooves, a keyway member engaged within each of said pair of grooves and having lands on one of their faces arranged complementary to and facing the under-cut portions of said grooves, resilient means urging said keyway members to engage said lands with the undercut portions of said grooves to lock the bricks against movement relative to each other, said keyway member being smaller than said grooves forming mortar spaces between the faces of said keyway members and the adjacent walls of the bricks defining said grooves, and mortar filling said mortar spaces, said resilient means comprising elongated leaf spring secured intermediate of their ends to the sides of said keyway members opposite the sides formed with said lands, said leaf springs having their free ends flexed to engage the walls of the bricks defining the grooves opposite the under-cut portions of said grooves.

3. Means for connecting together a pair of superimposed bricks having their adjacent faces abutting one another, the bricks having their adjacent faces formed with spaced aligned pairs of under-cut grooves, a keyway member engaged within each of said pair of grooves and having lands on one of their faces arranged complementary to and facing the under-cut portions of said grooves, resilient means urging said keyway members to engage said lands with the undercut portions of said grooves to lock the bricks against movement relative to each other, said keyway member being smaller than said grooves forming mortar spaces between the faces of said keyway members and the adjacent walls of the bricks defining said grooves, and mortar filling said mortar spaces, said resilient means comprising elongated leaf spring secured intermediate of their ends to the sides of said keyway members opposite the sides formed with said lands, said leaf springs having their free ends flexed to engage the walls of the bricks defining the grooves opposite the under-cut portions of said grooves, and water destructible elements initially holding the free ends of said leaf springs flush against the sides of said keyway members to which said leaf springs are attached, whereby when said keyway members are inserted into said grooves and said mortar spaces are filled with wet mortar the moisture in the mortar will release said water destructible elements freeing the ends of said leaf springs to flex to their operative positions through the wet mortar.

STANLEY A. McKUSKIE.

REFERENCES CITED

The following references are of record in the file of this patent:

UNITED STATES PATENTS

| Number | Name | Date |
|---|---|---|
| 175,796 | Wands | Apr. 4, 1876 |
| 250,635 | McLean | Dec. 6, 1881 |
| 605,468 | Bennett | June 14, 1898 |
| 1,088,040 | Stanton | Feb. 24, 1914 |
| 1,122,866 | Cordes | Dec. 29, 1914 |
| 1,295,919 | Muhlhausen | Mar. 4, 1919 |
| 1,474,148 | Hopkins | Nov. 13, 1923 |
| 1,617,527 | Knight | Feb. 15, 1927 |
| 1,667,160 | Kleinfeldt | Apr. 24, 1928 |
| 1,975,470 | McInerney | Oct. 2, 1934 |
| 2,282,829 | Schurman | May 12, 1942 |
| 2,307,293 | Paul et al. | Jan. 5, 1943 |

FOREIGN PATENTS

| Number | Country | Date |
|---|---|---|
| 21,584 | Great Britain | 1898 |
| 217,361 | Great Britain | June 19, 1924 |
| 223,820 | Great Britain | Oct. 30, 1924 |